United States Patent Office 2,991,704
Patented July 11, 1961

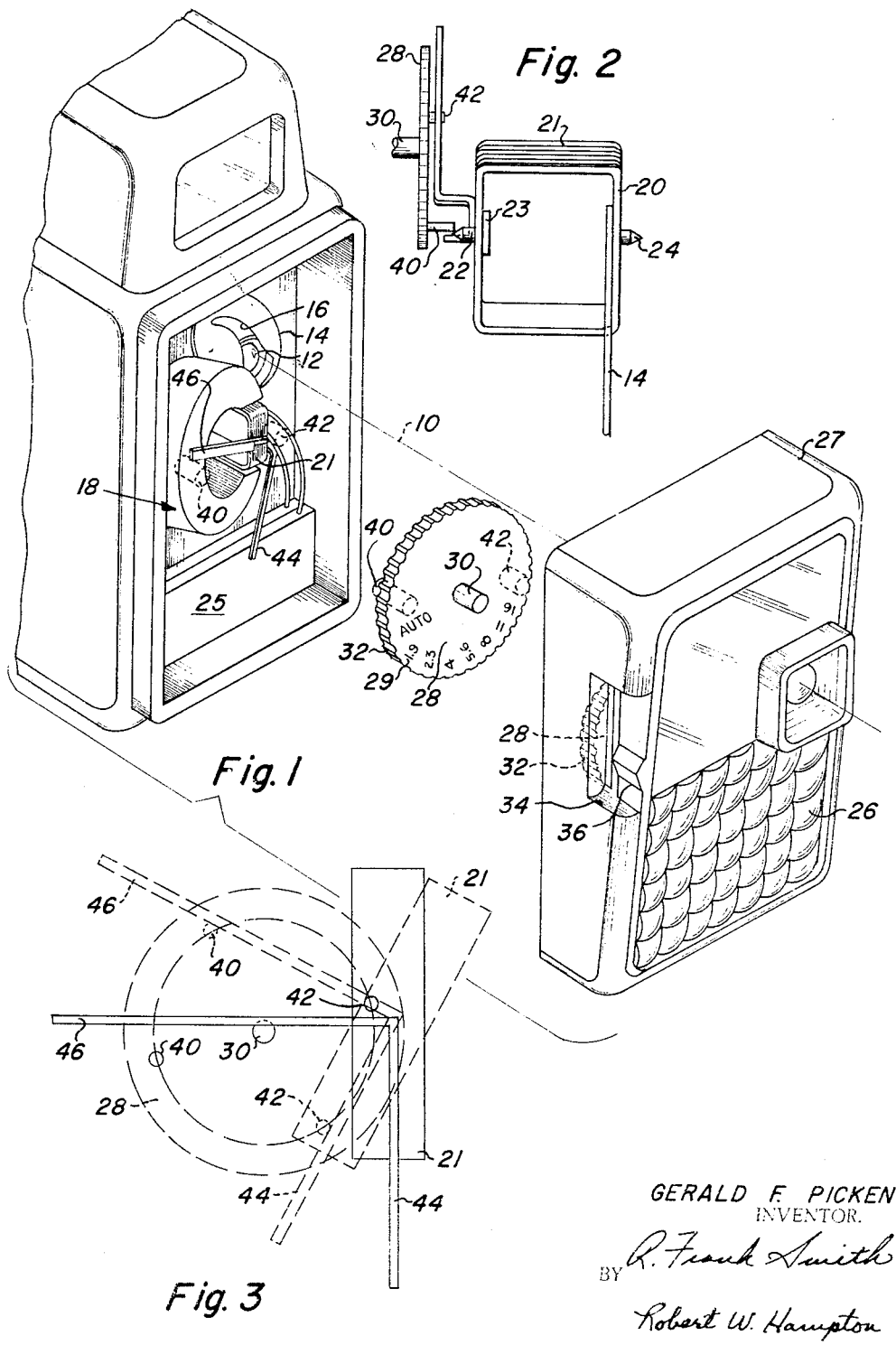

2,991,704
MANUAL CONTROL OF EXPOSURE CONTROL SYSTEM FOR PHOTOGRAPHIC CAMERA
Gerald F. Pickens, Rochester, N.Y., assignor to Eastman Kodak Company, Rochester, N.Y., a corporation of New Jersey
Filed May 20, 1959, Ser. No. 814,583
5 Claims. (Cl. 95—64)

The present invention relates to photographic cameras having automatic exposure control systems and more particularly concerns devices for manually overriding the automatic control of the exposure systems in such cameras.

Many photographic cameras are provided with means for automatically regulating the exposure of films as a function of the intensity of light from the screen or object that is to be photographed. The exposure can be regulated by controlling either the size of the exposure aperture or the shutter speed or both. An automatic exposure control system customarily includes a photoelectric cell which drives an electric measuring instrument such as pivoted-coil galvanometer. The combination of cell and galvanometer constitutes a device which may be referred to broadly as an exposure meter, in which the pivoted coil constitutes a mechanical output member whose position is a function of the scene brightness. Instead of a galvanometer, the exposure meter may comprise a hot-wire actuator, a solenoid or other device having a mechanical output member which can be positioned as a function of the amplitude of an electric input signal from the photoelectric cell.

A camera that is equipped with an automatic exposure control system ordinarily requires no manual setting of the exposure factors. However, in situations where there is unusual backlighting of the subject, or if for any other reason a deliberate overexposure or underexposure is desired, it is convenient to provide manually operable means for overriding the automatic system and manually setting the diaphragm aperture or the shutter speed or both.

In one manual override device of the prior art the circuit comprising the photoelectric cell and the instrument has been opened or shorted to return the instrument coil to a zero position corresponding, for example, to maximum diaphragm aperture. Then, a manually movable member rotates the instrument coil to any desired position. This form of manual override device requires the presence of an electric switch in a circuit of very low power and becomes inoperative quite easily if the switch contacts become oxidized or soiled. A second form of manual override device known in the art avoids the use of a switch in the exposure meter circuit and has a pair of manually movable bracketing members which cooperate with the instrument coil to move it in either direction under direct manual control, but which normally lie outside of the range of automatic coil movement. This form of manual override device is undesirable because it does not firmly hold the instrument coil in any manually set position; physical shock or a change in the energization of the electrical system can move the coil away from its manually set position.

It is therefore a primary object of the present invention to manually adjust the automatic exposure control system of a camera to any desired setting without disconnecting or shorting any of the electrical circuit of the control system, yet firmly holding the system in its desired setting.

A more general object of the invention is to provide an improved manual override device which is rugged and relatively inexpensive.

Other objects of the invention will apepar from the following description, reference being made to the accompanying drawings, wherein:

FIG. 1 is an exploded isometric view of a camera embodying the manual override mechanism of the present invention;
FIG. 2 is a side view of the manual override mechanism; and
FIG. 3 is a front view of the manual override mechanism showing alternate positions of the adjusting pins for automatic and manual exposure control, respectively.

Referring to FIG. 1, a typical camera embodying the present invention has a lens axis 10 with which are aligned a lens system indicated generally at 12, a teardrop aperture 16 of a movable diaphragm vane 14, a shutter and a photosensitive surface such as a film strip. The shutter and film strip are well known in the art and are not shown in the drawing. The diaphragm vane 14 is secured to a rectangular frame 20 (FIG. 2) which supports the moving coil 21 of an electric measuring instrument indicated generally at 18 in FIG. 1. Frame 20 is pivoted on a horizontal axis by pivots such as 22 and 24 (FIG. 2). Coil 21 is connected to and receives its electrical input from a light-sensitive device such as a photocell 25 (FIG. 1), which is mounted in the camera front 27 and is positioned to be illuminated by light from the photographic subject through a lens block 26.

In a manner well known in the art coil 21 and its frame 20 are rocked about pivots 22 and 24 (FIG. 2) to various angular positions corresponding to the intensity of the scene lighting, and at minimum scene brightness are maintained in a non-energized position by return springs such as 23. In the following description and the appended claims, wherever reference is made to coil 21 this will also include the frame 20 which moves with the coil and supports it. The diaphragm vane 14 moves with coil 21 to adjust the size of the exposure aperture as a function of scene brightness, and establishes a maximum aperture, corresponding to minimum scene brightness, when the coil is in its non-energized position. A single-vane diaphragm of the type illustrated in FIG. 1 is shown in detail in U.S. Patent 2,163,737.

A circular control disk 28 is mounted for rotation about a central pivot 30 in the camera front 27 and has a serrated edge 32 which adapts the disk for manual rotation and which is accessible in a recess 34 in the camera front. A fixed pointer 36 integral with the camera front may be employed for identifying the angular position of disk 28 by cooperation with any convenient scale of aperture values, such as shown at 29, imprinted on the face of the control disk near its periphery.

A pair of driving pins 40 and 42 are secured to the inner face of disk 28 and extend inwardly from the disk. Pin 40 is substantially longer than pin 42. The driving pins cooperate with a pair of arms 44 and 46, each of which is secured at one end to the axis of coil 21. Arms 44 and 46 are disposed at substantially right angles to the coil axis at different points along that axis, so that the arms move pivotally in separate, parallel planes. The lengths of pins 40 and 42 are such that pin 40 is adapted to engage either arm 44 and 46 while pin 42 can engage only the closer arm 44.

When disk 28 is in an extreme counterclockwise position, corresponding to automatic diaphragm control, pins 40 and 42 are in the positions indicated by solid lines in FIG. 3. In this position of disk 28, coil 21 and arms 44 and 46 are free to move throughout their entire angular ranges for automatic exposure control. The coil 21 and arms 44 and 46 are shown in solid lines in FIG. 3 near their extreme counterclockwise positions during automatic control. From these positions the coil and arms are free to move clockwise until arm 44 engages the longer pin 40 or counterclockwise until arm 46 engages pin 40. In the illustrated example this permits the coil and arms to move approximately a quarter turn during automatic exposure control. Although arm 46 may pass the position of pin 42 during such movement, the plane in which this arm rotates is not intersected by the latter pin; therefore, no contact occurs between these two elements.

When manual exposure control is desired, disk 28 may be rotated clockwise so that pin 40 engages the counterclockwise surface of arm 46 and moves that arm, as well as coil 21 and vane 14, clockwise to any desired position as determined by the position of reference mark 36 to scale 29 (FIG. 2). The location of pin 42 is such that it engages the clockwise surface of arm 44, thereby preventing the coil from moving clockwise away from its manually set position in response to instrument shock or an overriding electric signal from the photocell.

It will be obvious that the shorter driving pin may engage the counterclockwise surface of arm 44 while the longer pin engages the clockwise surface of arm 46, but that in either case, the pins must engage "rotationally opposite" surfaces of the arms.

The desired abutting relation of the driving pins 40 and 42 to the closer or adjacent surfaces of coil arms 46 and 44, respectively, is achieved by proper location of the driving pins and coil arms. In the embodiment shown in the drawings, the driving pins are located in diametric opposition on disk 28 and therefore constitute the rotating base of a semicircle. In this case, arms 44 and 46 must be at right angles in order to achieve the desired result, this being due to the obvious principle that the angle subscribed in a semicircle is a right angle. If one of the pins is relocated relative to the other on disk 28, the angle between arms 44 and 46 must be adjusted accordingly but will, of course, be constant for all positions of the coil and control disk.

The invention has been described in detail with particular reference to preferred embodiments thereof, but it will be understood that variations and modifications can be effected within the spirit and scope of the invention as described hereinabove and as defined in the appended claims. It is particularly understood that the manual override system may be employed in conjunction with an exposure control system wherein the shutter speed rather than the diaphragm opening is adjusted automatically. For this purpose, the diaphragm vane 14 may be replaced by a shutter speed ring or by mechanism connected to the shutter speed ring.

I claim:
1. In a photographic camera having means for focusing an image of a viewed scene onto a photosensitive surface; an exposure meter disposed for energization by light from said scene and having a coil pivoting about an axis within a predetermined angular range as a function of the brightness of said scene; and a diaphragm mechanism coupled to said coil and adjusted by pivotal movement of said coil for automatically regulating the admission of scene light to said photosensitive surface as a function of scene brightness; the improvement in means for manually adjusting said diaphragm mechanism, comprising: first and second arms connected to said coil and extending substantially perpendicularly to the pivotal axis of said coil for pivotal movement therewith in separate planes and throughout respective angular ranges; a control disc mounted on said camera for angular movement about an axis under manual control; a first driving pin secured to said disc and extending into the planes of movement of both of said arms for cooperation with the latter; a second driving pin secured to said disc and extending into the plane of movement of only said second arm for cooperation therewith, said disc having at least one position wherein it maintains said first pin at approximately one limit of the angular range of one of said arms, said disc, upon movement thereof away from said position, carrying said first pin into engagement with said first arm for pivoting said first arm and said coil, thereby to adjust said diaphragm mechanism, and carrying said second pin into engagement with said second arm on the side thereof rotationally opposite to the side of said first arm engaged by said first pin, thereby to prevent movement of said first arm out of engagement with said first pin.

2. The manual adjusting means defined in claim 1, wherein said first driving pin engages the counterclockwise surface of said first arm and said second driving pin engages the clockwise surface of said second arm.

3. The manual adjusting means defined in claim 1, wherein said first driving pin engages the clockwise surface of said first arm and said second driving pin engages the counterclockwise surface of said second arm.

4. In a photographic camera having means for focusing an image of a viewed scene onto a photosensitive surface; an exposure meter disposed for energization by light from said scene and having a pivoted member movable about an axis within a predetermined angular range as a function of the brightness of said scene; and a diaphragm mechanism coupled to said pivoted member and adjusted by movement of said pivoted member for automatically regulating the admission of scene light to said photosensitive surface as a function of scene brightness; the improvement in means for manually adjusting said diaphragm mechanism, comprising: first and second driven abutment members connected to said pivoted member and extending substantially perpendicularly to the axis of said pivoted member for movement therewith in separate planes and throughout respective angular ranges; a control member mounted on said camera for angular movement about an axis under manual control; a first driving abutment member secured to said control member and extending into the planes of movement of both of said driven abutment members for cooperation with the latter; a second driving abutment member secured to said control member and extending into the plane of movement of only said second driven abutment member for cooperation therewith, said control member having at least one position wherein it maintains said first driving abutment member at approximately one limit of the angular range of one of said driven abutment members, said control member, upon movement thereof away from said position, carrying said first driving abutment member into engagement with said first driven abutment member for pivoting both the latter and said pivoted member, thereby to adjust said diaphragm mechanism, and carrying said second driving abutment member into engagement with said second driven abutment member on the side thereof rotationally opposite to the side of said first driven abutment member engaged by said first driving abutment member, thereby to prevent movement of said first driven abutment member out of engagement with said first driving abutment member.

5. The manual adjusting means defined in claim 4, wherein said diaphragm mechanism includes a vane attached to said pivoted member and having a tapered aperture adjustable, by movement of said pivoted member and said vane, to different positions relative to said focusing means.

References Cited in the file of this patent
UNITED STATES PATENTS
2,841,064     Bagby et al. _____ July 1, 1958